(12) United States Patent
Floyd

(10) Patent No.: US 10,408,371 B2
(45) Date of Patent: Sep. 10, 2019

(54) CAM LEVER CLAMP FOR SANITARY FITTINGS

(71) Applicant: Michael G. Floyd, Everett, WA (US)

(72) Inventor: Michael G. Floyd, Everett, WA (US)

( * ) Notice: Subject to any disclaimer, the term of this patent is extended or adjusted under 35 U.S.C. 154(b) by 92 days.

(21) Appl. No.: 15/359,347

(22) Filed: Nov. 22, 2016

(65) Prior Publication Data

US 2017/0191589 A1 Jul. 6, 2017

Related U.S. Application Data

(60) Provisional application No. 62/273,292, filed on Dec. 30, 2015.

(51) Int. Cl.
| | |
|---|---|
| *F16L 23/10* | (2006.01) |
| *F16L 23/06* | (2006.01) |
| *F16L 23/18* | (2006.01) |
| *F16L 37/18* | (2006.01) |

(52) U.S. Cl.
CPC ............... *F16L 23/06* (2013.01); *F16L 23/10* (2013.01); *F16L 23/18* (2013.01); *F16L 37/18* (2013.01)

(58) Field of Classification Search
CPC . F16L 23/04; F16L 23/06; F16L 23/18; F16L 23/10; F16L 37/18
USPC .............. 285/394, 420, 337, 365, 407, 409
See application file for complete search history.

(56) References Cited

U.S. PATENT DOCUMENTS

| | | | |
|---|---|---|---|
| 1,202,678 A | 10/1916 | Curry | |
| 2,990,210 A | 6/1961 | Fremstad | |
| 3,705,737 A * | 12/1972 | Westerlund | F16L 23/06 24/271 |
| 3,828,403 A * | 8/1974 | Perrin | F16L 23/06 24/270 |
| 3,967,837 A * | 7/1976 | Westerlund | F16L 17/04 285/112 |
| 4,311,248 A * | 1/1982 | Westerlund | F16L 33/12 277/616 |
| 4,643,460 A * | 2/1987 | Lieberg | F16L 17/04 24/271 |
| 4,660,869 A * | 4/1987 | Gabus | F16L 23/18 285/331 |
| 5,988,694 A * | 11/1999 | Brushaber | F16L 23/06 285/365 |
| 6,672,631 B1 | 1/2004 | Weinhold | |
| 8,371,623 B2 | 2/2013 | Bronnert | |
| 2003/0127851 A1 * | 7/2003 | Guslick | F16L 23/06 285/112 |
| 2009/0194994 A1 | 8/2009 | Weinhold | |

* cited by examiner

*Primary Examiner* — Aaron M Dunwoody
(74) *Attorney, Agent, or Firm* — Helsell Fetterman LLP; Lance D. Reich

(57) ABSTRACT

This disclosure relates to a cam-type sanitary clamp for releasably coupling two flanged ends of a sanitary fitting, such as a tri-clover fitting. The clamp has an upper clamp ring component hinged to a lower clamp ring component, with a threaded shaft component that is pivotally connected to the lower clamp ring component, a cylindrical pivot component, and a cam-type lever component. The lever is pivotally connected to the pivot component and has a plurality of protrusions, such as lobes, that are each configured to be compressed against the slotted opening of the upper clamp ring section when the cam-type lever component is manually rotated from an open position to a closed position to secure the clamp about the flanges of a sanitary fitting.

8 Claims, 5 Drawing Sheets

CAM LEVER CLAMP FOR SANITARY FITTINGS

BACKGROUND

1. Field of the Invention

The present invention generally relates to mechanical clamps. More particularly, the present invention relates to a clamp for a sanitary tri-clover fitting, with the clamp having a cammed closure lever.

2. Description of the Related Art

Sanitary couplings are used in applications such as the food processing, dairy, beverage, pharmaceutical, and biotechnology industries, where fluid lines and couplings must be configured so as to prevent fluid entrapment and minimize opportunities for bacteria to lodge and multiply. This requirement limits the materials, surface finishes, and physical configurations that can be used. Typically, sanitary tubes and fittings are made from rigid metals such as brass and stainless steel, and are polished to a highly smooth finish. Coupling gaskets can be made from metal, or from a polymers such as Nylon, Teflon, or silicone.

Common sanitary fluid couplers rely on manual clamps to secure components together, commonly referred to as a Tri-Clamp or tri-clover fitting. Conventional Tri-Clamps have an upper and a lower ring section connected on a hinged joint so that the clamp assembly can open and close. Two sections of tubing, which are to be joined, need to be held together along with an intervening gasket while the clamp is closed over them such that the flanged ends of the tubing are received within slotted groves on the inner diameter of the clamp rings. The clamp is then secured by turning a tightening wingnut-type bolt through many revolutions until the necessary clamping pressure is achieved.

There are a number of drawbacks to a conventional tri-clamp device. First, the clamp tends to easily fall into a wide "open" position, making it awkward and time consuming to close the clamp around the tubing sections using just one hand while holding the tubing section together with the other hand Second, after closing the clamp around the tubing sections, the clamp has to be firmly held in the "closed" position with one hand while the tightening bolt is maneuvered into position with the other hand and then rotated through many turns to secure the clamp. This process can be time consuming, inefficient, non-ergonomic, and error prone. In typical industrial and commercial settings there can be very large numbers of tubing sections that need to be connected, disconnected and re-arranged on a frequent basis necessitating the use of a large number of Tri-Clamps, and thus, a significant amount of manual labor.

SUMMARY OF THE INVENTION

This disclosure is directed toward a cam-type sanitary clamp for quickly coupling two sanitary fittings, such as tri-clover sanitary fittings or other types of clamps and fittings. The cam-type sanitary clamp may include a cam-type locking mechanism, which may be configured to allow quick fastening and unfastening of the clamp.

In some embodiments, the cam-type sanitary clamp may include an upper clamp ring component and a lower clamp ring component attached to the upper clamp ring component at one or more hinged joints. The hinged joint may allow the upper clamp ring component and the lower clamp ring component to rotate about the hinged joint and to surround the flanged ends of sanitary fittings.

The cam-type sanitary clamp may further include a shaft component, which may have a distal end pivotally connected to the lower clamp ring component; a mid-section that is receivable into a slotted opening in the upper clamp ring component; and a proximal end extending above the slotted opening when the mid-section is inserted in the slotted opening. In some embodiments, the shaft component may be a threaded bolt.

Additionally, the cam-type sanitary clamp may include a pivot component attached to the shaft component. In some embodiments, the pivot component may have a threaded cylindrical opening by which the pivot component is threaded onto to the proximal end of the threaded bolt of the shaft component.

In some embodiments, the cam-type sanitary clamp may further include a set screw configured to set the position of the hinge component on the shaft component. Accordingly, a user may use the set screw to set a height position for the cam-type lever such that the clamp securely locks and tightens when the cam-type lever component is manually pushed down to fit around the tri clover clamp, i.e., when the clamp has been locked with the cam-type lever component into "closed" position.

The cam-type sanitary clamp may include a cam-type lever component pivotally connected to the pivot component and comprising a plurality of protrusions each configured to be compressed against at least one ledge formed by the slotted opening of the upper clamp ring section when the cam-type lever component is manually hinged from an "open" position to a "closed" position. Accordingly, the cam-type sanitary clamp may be configured to retain the flanged ends of the sanitary fittings in a fluid tight relationship when the cam-type lever component is in the "closed" position. In some embodiments, a gasket may be placed between the two sanitary fittings to enhance the efficacy of the fluid tight relationship.

The cam-type lever component may be a made of metal or composites, and may be cast, milled, 3D-printed, lobed, and/or chamfered such that, when it is in "closed" position, the cam-type lever component fits around the clamp component while allowing a user to grasp the cam-type lever component in order to manually unfasten the clamp. "Closed" position may refer to the configuration such as that shown in FIG. 1, in which a cam-type lever component has been pushed down to tighten the cam-type sanitary clamp around a sanitary fitting pair.

In some embodiments, the cam-type sanitary clamp may include a means for temporarily securing the cam-type lever component in the "closed" position, such as a mechanism for protecting against unintended unfastening of the cam-type lever component. For example, the cam-type lever component include at least two surfaces each parallel to the front and back surfaces of the upper clamp ring component. The aforementioned surfaces of the cam-type lever component may be configured to be substantially flush with the outer surface of the upper clamp ring component when the cam-type lever component is in the "closed" position. Additionally, the cam-type lever component may include an extrusion configured to provide a leverage space, wherein the leverage space may allow access for manual release of the cam-type lever component from "closed" position to "open" position. Further, the cam-type lever component may allow for a user to easily grip and unfasten the clamp, such as by including a divot, a rough texture, or an easily grip-able material such as rubber.

A user may operate a cam-type sanitary clamp to securely connect both components of a sanitary fitting pair to each other. Specifically, after starting from an "open" position of the cam-type sanitary clamp, the user may manually fasten the cam-type sanitary clamp around the sanitary fitting pair and swing into place the shaft component, onto which the cam-type lever component has been connected by the pivot component. Finally, the user may bring the clamp into "closed" position by rotating the cam-type lever component to tighten and fasten the clamp, thereby securing the connection between the two pieces of the sanitary fitting pair.

Accordingly, cam-type sanitary clamps may offer a quicker, more ergonomic, more efficient alternative to a conventional tri-clover clamps. Many industrial and commercial settings may benefit from the labor and hassle saved by using cam-type sanitary clamps for quickly and more ergonomically fastening and unfastening the large quantities of tubing sections that need to be connected, disconnected and re-arranged on a frequent basis.

Specifically, the cam-type lever component may be configured to replace a component on a conventional tri clover clamp, such as a twist-type bolt, fastener or other type of locking mechanism, thus allowing operators to easily improve previously installed or existing clamps, which would allow for saving time in many situations, such as in a winery, distillery, cider house, dairy farm, or brewery (e.g., when transferring beer from a fermentation tank to a bright tank). The manual twist bolt of a conventional clamp may be removed manually by fully unscrewing it and the cam-type lever can be configured to fit on the threads once the traditional twist bold is removed.

DETAILED DESCRIPTION

Figure 1:
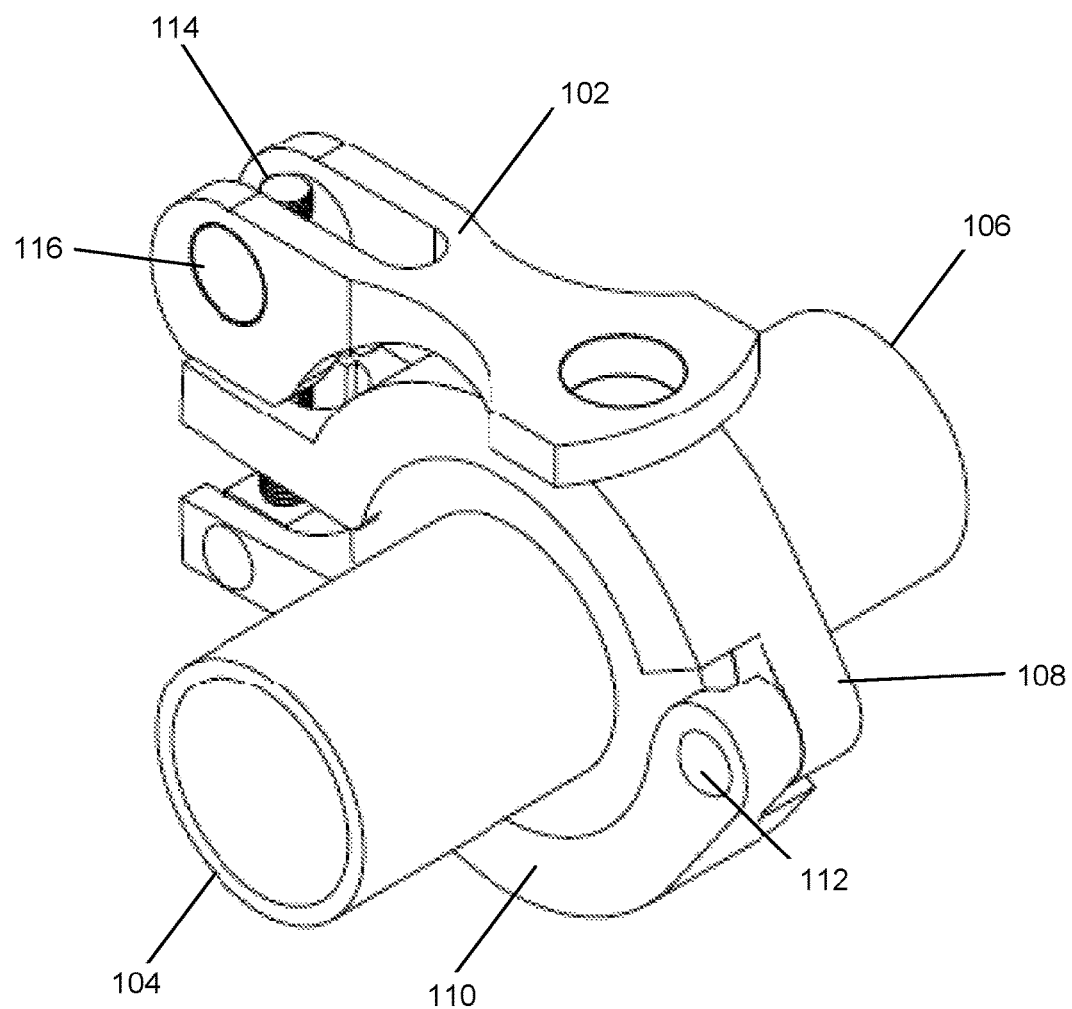
FIG. 1 is a perspective view of an exemplary cam-type sanitary clamp with cam-type lever component in "closed" position, coupling a pair sanitary pipe fittings.
Figure 2:
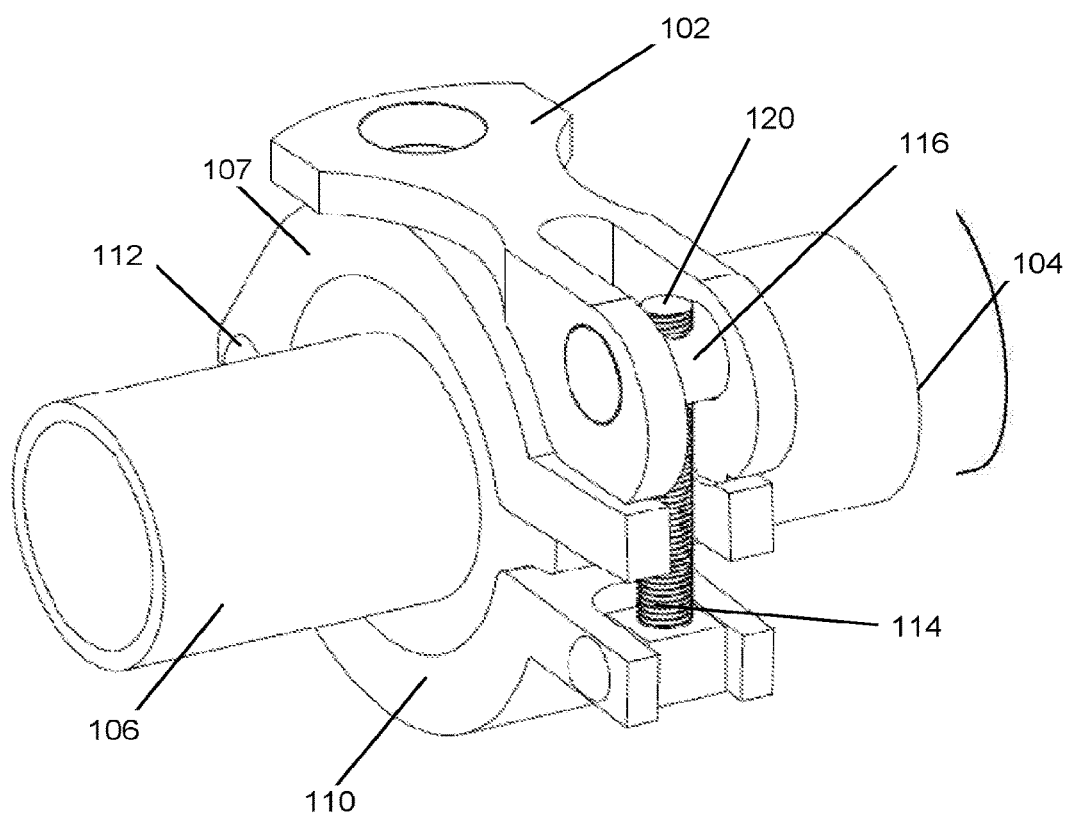
FIG. 2 is a reverse perspective view of an exemplary cam-type sanitary clamp with a cam-type lever component in "closed" position, coupling a pair of sanitary pipe fittings.
Figure 3:
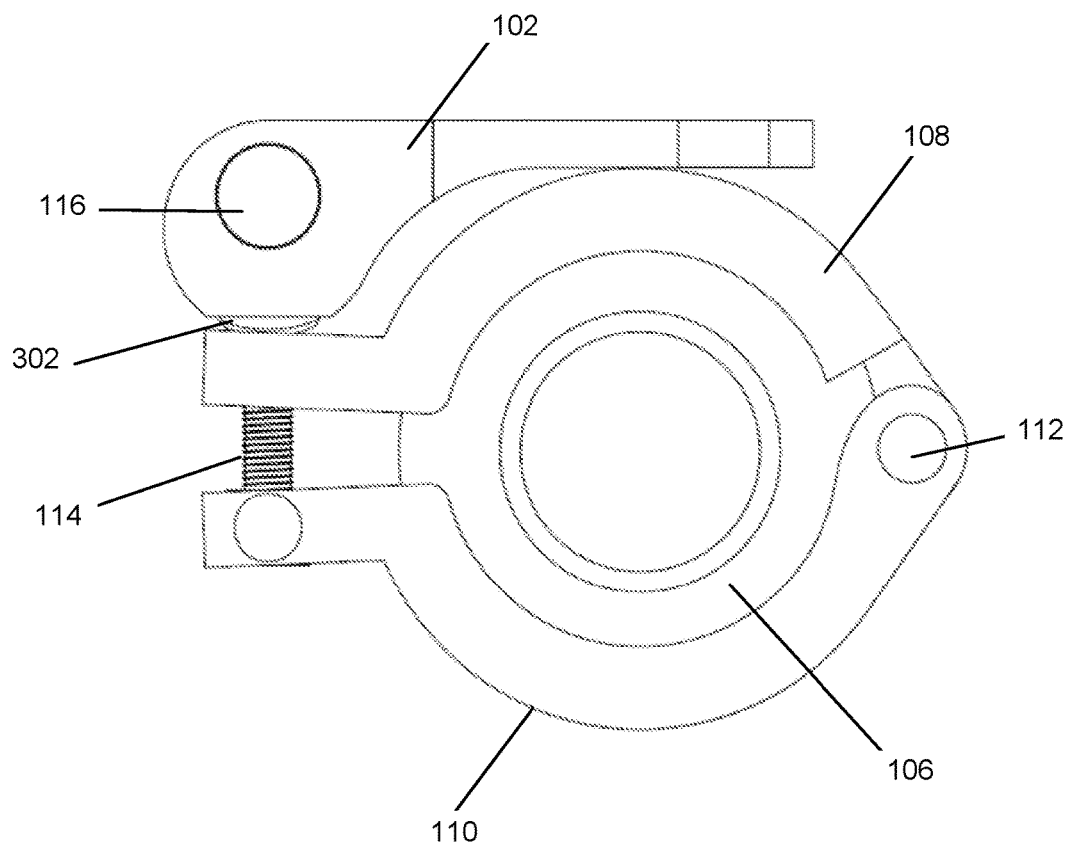
FIG. 3 is a side view of an exemplary cam-type sanitary clamp with a cam-type lever component in "closed" position, coupling a pair of sanitary pipe fittings.

FIGS. 1 through 3 depict a perspective view, a reverse-perspective view, and profile view, respectively, of an exemplary cam-type sanitary clamp 100 with a cam-type lever component 102 in "closed" position, coupling sanitary pipe fittings 104 and 106. "Closed" position may refer to the configuration in which a cam-type lever component 102 has been pushed down to tighten the cam-type sanitary clamp 100 around the sanitary pipe fittings 104 and 106.

Figure 4:
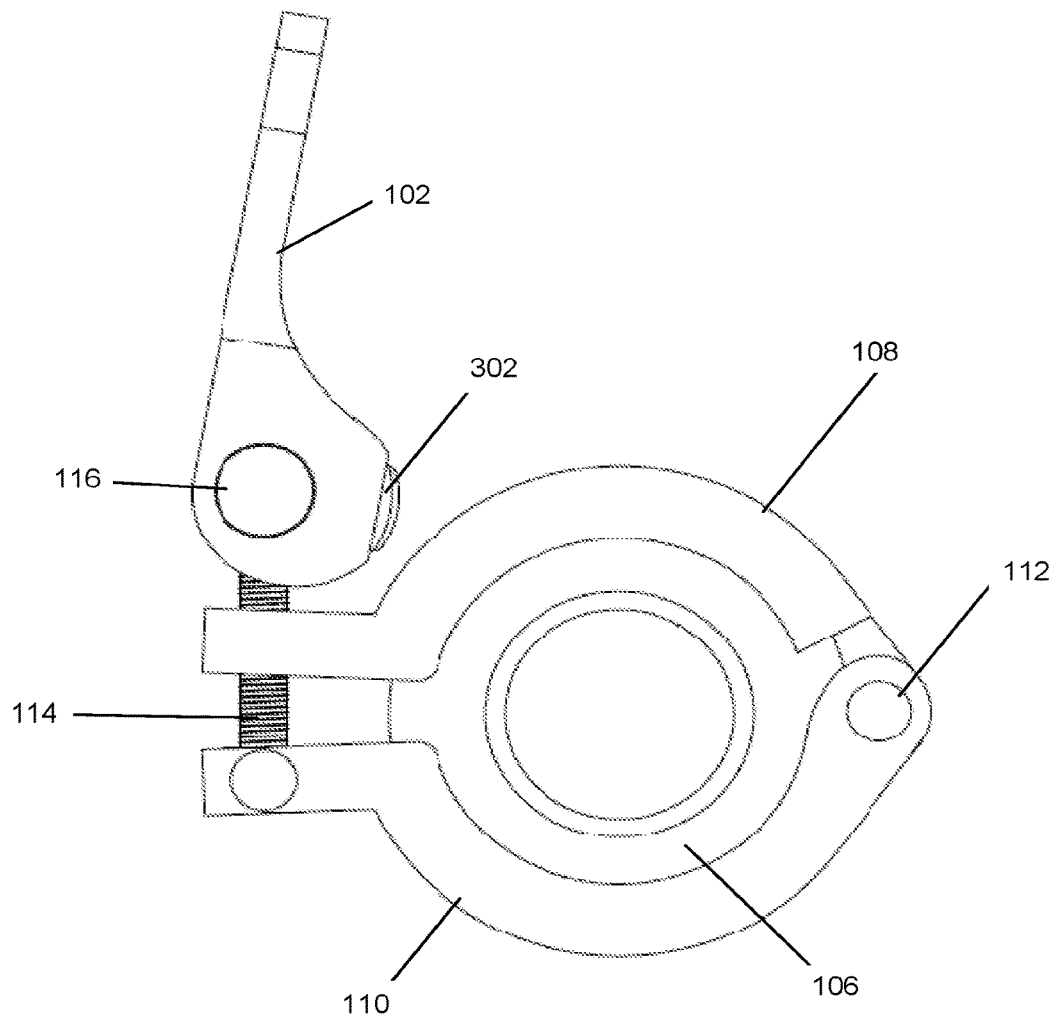
FIG. 4 is a side view of an exemplary cam-type sanitary clamp with a cam-type lever component in "open" position.

FIG. 4 depicts an exemplary cam-type sanitary clamp 100 with a cam-type lever component 102 in an "open" position. An "open" position may be any configuration of the cam-type sanitary clamp 100 when the cam-type lever is component 102 is not substantially in a "closed" position.

In some embodiments, the cam-type sanitary clamp 100 may include an upper clamp ring component 108 and a lower clamp ring component 110 attached to the upper clamp ring component 108 at a hinged joint 112. The hinged joint 112 may allow the upper clamp ring component 108 and the lower clamp ring component 110 to rotate about the hinged joint 112 and to surround the flanged ends of sanitary fittings 104 and 106, such as in a tri-clover fitting.

The cam-type sanitary clamp 100 may further include a shaft component 114, which may have a distal end pivotally connected to the lower clamp ring component 110; a mid-section that is receivable into a slotted opening in the upper clamp ring component 108; and a proximal end extending above the slotted opening when the mid-section is inserted in the slotted opening. In some embodiments, the shaft component 114 may include threaded bolt.

Additionally, the cam-type sanitary clamp 100 may include a pivot component 116 attached to the shaft component 114. In some embodiments, the pivot component 116 may have a threaded cylindrical opening by which the pivot component 116 is threaded onto to the proximal end of the threaded bolt of the shaft component 114.

In some embodiments, the cam-type sanitary clamp 100 may further include a set screw 120 configured to set the position of the pivot component 116 upon the shaft component 114. Accordingly, a user may screw the pivot component 116 to a position such that the clamp securely locks and tightens when the cam-type lever component 102 is manually pushed down to fit around the cam-type sanitary clamp 100, i.e., when the cam-type sanitary clamp 100 has been closed with the cam-type lever component into "closed" position.

Figure 5:
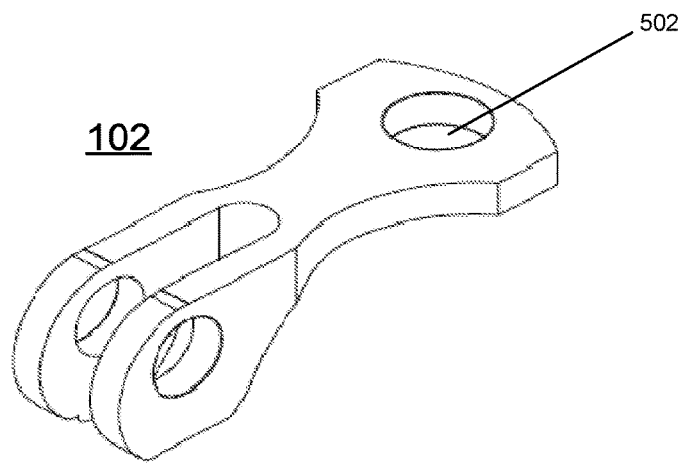
FIG. 5 is a perspective view of an exemplary cam-type lever component.
Figure 6:
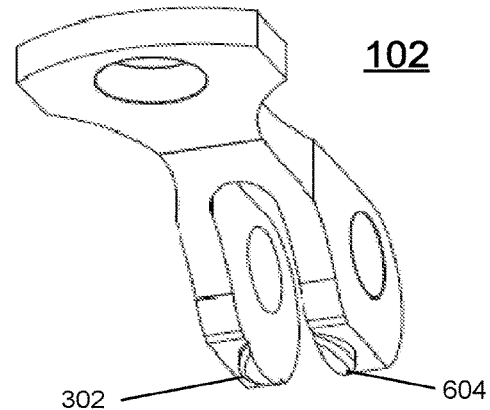
FIG. 6 is a reverse perspective view of an exemplary cam-type lever component, featuring its rounded protrusions.
Figure 7:
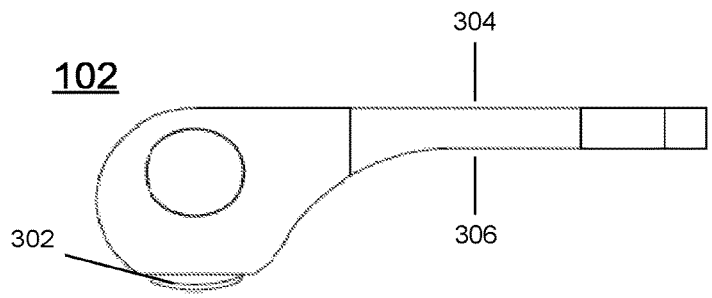
FIG. 7 is a side view of an exemplary cam-type lever component, featuring its rounded protrusions.

FIGS. 5 through 7 depict a perspective view, a reverse perspective view, and a profile view, respectively, of an exemplary cam-type lever component 102.

In some embodiments, the cam-type lever component 102 may comprise a plurality of protrusions 302 and 604, such as a lobe. Each protrusion is configured to be compressed against at least one ledge formed by the slotted opening of the upper clamp ring section when the cam-type lever component 102 is manually rotated from an "open" position to a "closed" position. In various embodiments, at least one protrusion may at least partially include a rounded surface, such as a semi-spherical lobe or other planar offset that creates pressure with the pivoting of the lever.

The cam-type lever component 102 may be a made of metal, and may be cast, milled, lobed, and/or chamfered such that, when it is in "closed" position, the cam-type lever component 102 fits around the clamp component while allowing a user to grasp the cam-type lever component in order to manually unfasten the clamp.

Accordingly, the cam-type sanitary clamp 100 may be configured to retain the flanged ends of the sanitary fittings 104 and 106 in a fluid tight relationship when the cam-type lever component 102 is in the "closed" position. In some embodiments, a gasket may be placed between the two sanitary fittings to enhance the efficacy of the fluid tight relationship.

In some embodiments, the cam-type sanitary clamp 100 may include a means for temporarily securing the cam-type lever component 102 in the "closed" position, such as a mechanism for protecting against unintended unfastening of the cam-type lever component 102. For example, the cam-type lever component 102 includes at least two surfaces 304 and 306 each parallel to the front and back surfaces of the upper clamp ring component 108. The aforementioned surfaces of the cam-type lever component 102 may be configured to be substantially flush with the outer surface of the upper clamp ring component 108 when the cam-type lever component 102 is in the "closed" position. Additionally, the cam-type lever component 102 may include an extrusion configured to provide a leverage space 502, wherein the leverage space may allow access for manual release of the cam-type lever component 102 from "closed" position to "open" position. A leverage space may be a divot, dimple, or other crevice shaped to accommodate the tip of a nail or finger so that a user may gain leverage. Alternatively or concurrently, the cam-type lever component 102 may allow for a user to easily grip and unfasten the clamp, such as by including at least one of the following: a divot, a beveled undercut, a handle shape, a rough texture, or an easily graspable material such as rubber.

Alternatively or concurrently, a means for temporarily securing the cam-type lever component 102 in the "closed" position may include a latch connected to the outer surface of the upper clamp ring component 108. Alternatively, the cam-type lever component 102 and upper clamp ring component 108 may be configured with magnets to be magnetically attracted to one another.

A user may operate a cam-type sanitary clamp 100 to securely connect both components of a sanitary fitting pair to each other. Specifically, after starting from an "open" position of the cam-type sanitary clamp 100, the user may manually fasten the cam-type sanitary clamp 100 around the sanitary pipe fittings 104 and 106 and swing into place the shaft component 114, onto which the cam-type lever component 102 has been connected by the pivot component 116. Finally, the user may bring the cam-type sanitary clamp 100 into "closed" position by rotating the cam-type lever component 102 to tighten and fasten the cam-type sanitary clamp 100, thereby securing the connection between the sanitary pipe fittings 104 and 106.

Although the subject matter has been described in language specific to structural features and/or methodological acts, it is to be understood that the subject matter defined in the appended claims is not necessarily limited the specific features or acts described above. Rather, the specific features and acts described above are disclosed as exemplary forms of implementing the claims.

What is claimed is:

1. A cam-type sanitary clamp for releasably coupling two sanitary fittings, comprising:
    an upper clamp ring component having a slotted opening;
    a lower clamp ring component attached to the upper clamp ring component at a hinged joint and rotatable thereabout such that the upper clamp ring and lower clamp ring are configurable to surround flanged ends of a sanitary fitting;
    a shaft component having a distal end pivotally connected to the lower clamp ring component at a first pivot component, a mid-section which is receivable into the slotted opening in the upper clamp ring component, and a proximal end extending above the slotted opening when the mid-section is inserted within the slotted opening, the shaft component including threading substantially along the length of the shaft component;
    a second pivot component in rotatable connection to the threading on the proximal end of the shaft component, the proximal end of the shaft component extending completely through the second pivot component, wherein the second pivot component is adjustable substantially along the length of the shaft component; and
    a cam-type lever component pivotally connected to the second pivot component and comprising at least one protrusion configured to be compressed against at least one ledge formed by the slotted opening of the upper clamp ring section when the cam-type lever component is manually rotated about the second pivot component to a closed position to secure the clamp around a sanitary fitting.

2. The clamp of claim 1, wherein the shaft component is a threaded bolt, and the second pivot component has a threaded cylindrical opening that is threaded onto the shaft component.

3. The clamp of claim 1, wherein each of the at least one protrusion has at least one rounded surface.

4. The clamp of claim 1, wherein the second pivot component is substantially cylindrical.

5. The clamp of claim 1, wherein the clamp further includes a gasket configured to be placed between two sanitary fittings before coupling, thereby creating a fluid tight seal upon the clamp being closed about the sanitary fitting.

6. A clamping means for releasably coupling two sanitary fittings, comprising:
    a hinge means for attaching a lower clamp ring component to an upper clamp ring component, thereby allowing the upper clamp ring component and the lower clamp ring component to rotate about the hinge means to surround the flanged ends of sanitary fittings;
    a first pivot means for pivotally connecting a distal end of a shaft component to the lower clamp ring component, wherein the shaft component comprises a mid-section which is receivable into a slotted opening in the upper clamp ring component and a proximal end extending above the slotted opening when the mid-section is inserted in the slotted opening;
    a connection means for connecting a pivot component to the proximal end of the shaft component; and
    a second pivot means for pivotally connecting a cam-type lever means to the pivot component, the shaft component extending completely through the second pivot means, wherein the second pivot means is adjustable substantially along the length of the shaft component; and
    a cam-type lever means for selectively moved from an open position to a closed position, the lever means including at least one protrusion configured to be compressed against at least one ledge formed by the slotted opening of the upper clamp ring section when the cam-type lever component is moved to a closed position.

7. The clamping means of claim 6, wherein the shaft component is a threaded bolt, and the second pivot means has a threaded cylindrical opening and is threaded onto the shaft component.

8. A cam-type sanitary clamp for releasably coupling a tri-clover fitting, comprising:
    an upper clamp ring component including a front and back surface thereof;
    a lower clamp ring component attached to the upper clamp ring component at a hinged joint, thereby allowing the upper clamp ring component and the lower clamp ring component to rotate about the hinged joint and to surround the flanged ends of a tri-clover fitting;
    a shaft component having a distal end pivotally connected to the lower clamp ring component at a first pivot component, a mid-section which is receivable into a slotted opening in the upper clamp ring component, and a proximal end extending above the slotted opening when the mid-section is inserted in the slotted opening, the shaft component including threading substantially along the length of the shaft component;

a cylindrical second pivot component having a threaded cylindrical opening by which the second pivot component is threaded onto the proximal end of the shaft component such that the proximal end of the shaft component extends completely through the cylindrical second pivot component, wherein the cylindrical second pivot component is adjustable substantially along the length of the shaft component;

a set screw configured to set the position of the second pivot component on the shaft component;

a cam-type lever component pivotally connected to the second pivot component and comprising a plurality of protrusions each configured to be compressed against at least one ledge formed by the slotted opening of the upper clamp ring section when the cam-type lever component is manually hinged from an open position to a closed position to hold the clamp about a tri-clover fitting in a fluid tight relationship.

\* \* \* \* \*